May 13, 1969     L. D. DRUGMAND     3,444,357
ELECTRIC HEATING APPARATUS
Filed Feb. 7, 1967
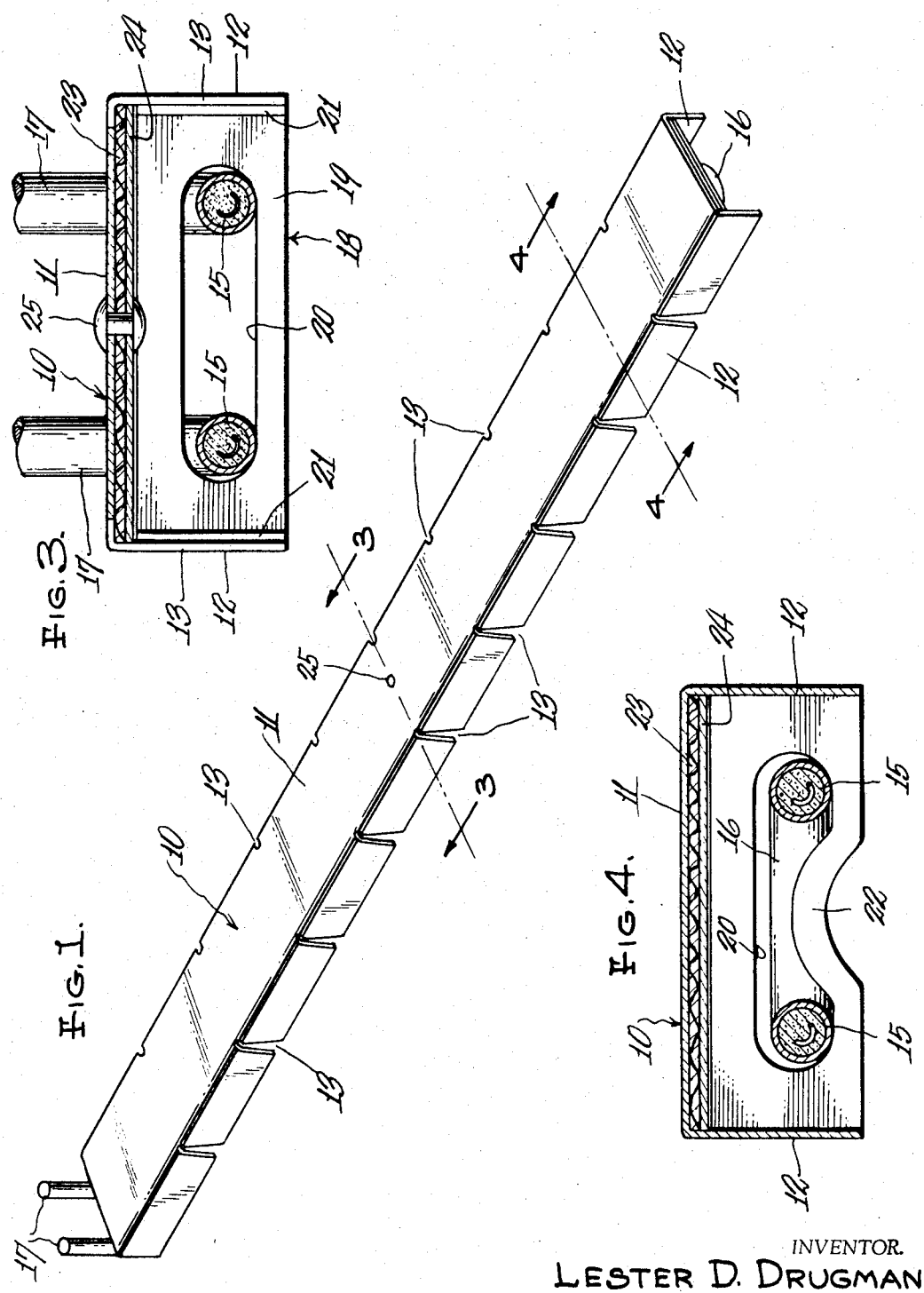
INVENTOR.
LESTER D. DRUGMAND
BY
ATTORNEYS

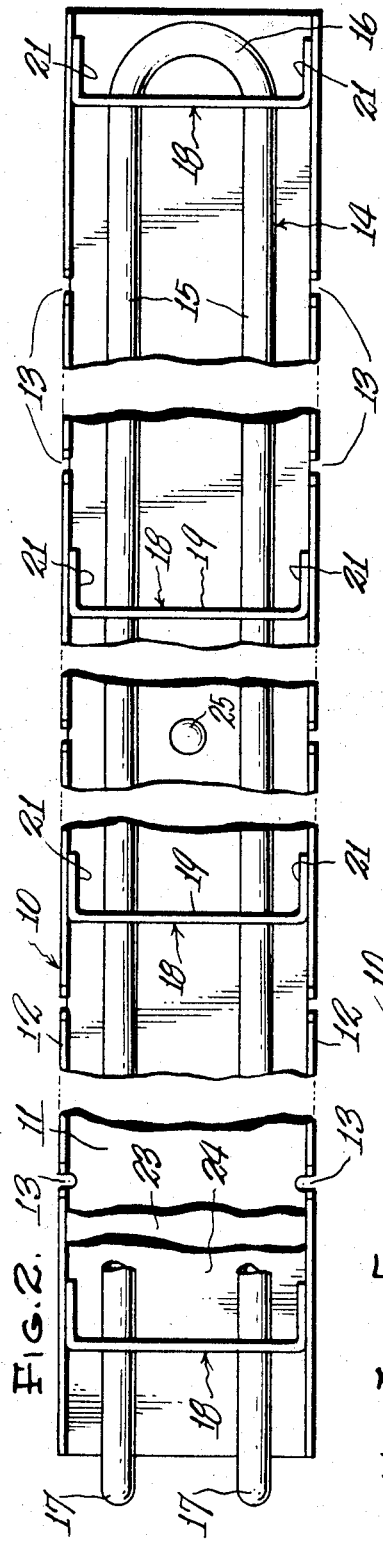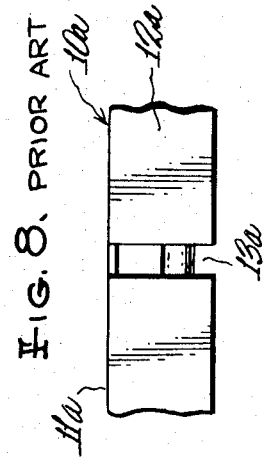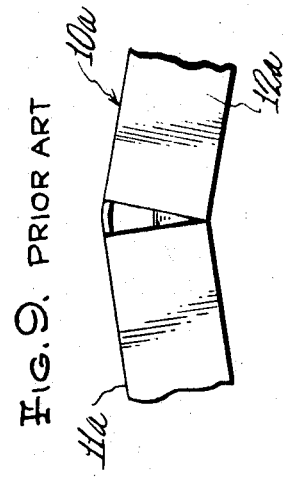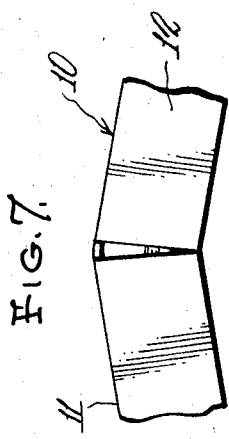

United States Patent Office 3,444,357
Patented May 13, 1969

3,444,357
ELECTRIC HEATING APPARATUS
Lester D. Drugmand, Pittsburgh, Pa., assignor to
Edwin L. Wiegand Company, Pittsburgh, Pa.
Filed Feb. 7, 1967, Ser. No. 614,503
Int. Cl. H05b 3/58
U.S. Cl. 219—535                                8 Claims

ABSTRACT OF THE DISCLOSURE

An electric heater assembly which is longitudinally deformable to correspond to various curved surfaces to be heated, thus adapting the assembly for weld pre-heating and the like. The assembly includes a trough-shape housing and a metal-sheathed hair-pin type heater element held within the trough by means of a plurality of brackets, the element passing through slots in the brackets and the wall of one bracket being deformed to form an abutment engageable with the bight of the element. The walls of the trough are formed with a series of triangularly shaped slots to increase longitudinal flexibility of the assembly. A reflector and heat insulator are included in the assembly to concentrate the heat.

Preamble

In, for example, the manufacture of ships and other large metal structures, it is customary to weld large metal plates to each other. Since the welding operation causes intense, localized heating of the plates, it has been found highly desirable to preheat the plates prior to welding to minimize stresses and possible distortion caused by welding. A highly efficient device for heating such plates is a tubular, metallic sheathed, electric resistance heating element mounted within a trough-like housing as disclosed in Letters Patent 3,207,887. While such patent structure is highly efficient, it has been higher in cost than is desirable and its relative complexity has made it susceptible to damage in the rough environment to which it is subjected.

In contrast, the present invention provides simple, low-cost, rugged structure especially well-adapted for its intended purpose. These and other advantages will readily become apparent from a study of the following description and from the drawings appended hereto.

Description of drawings

In the drawings accompanying this specification and forming a part of this application there is shown, for purpose of illustration, an embodiment which the invention may assume, and in these drawings:

FIGURE 1 is a perspective view of a preferred embodiment of the invention,

FIGURE 2 is a broken, bottom-side plan view of the heater assembly seen in FIGURE 1, FIGURE 3 is a still further enlarged transverse sectional view generally corresponding to the line 3—3 of FIGURE 1, FIGURE 4 is a view similar to FIGURE 3 but generally corresponding to the line 4—4 of FIGURE 1, FIGURE 5 is a reduced size elevational view of the heater assembly in use with a curved plate to be heated, FIGURE 6 is a fragmentary side elevational view of the present heater assembly showing the latter in rectilinear form for use with a flat plate to be heated, FIGURE 7 is a view like FIGURE 6 but showing the heater bent to more or less conform to the exterior of a curved plate to be heated, and FIGURES 8 and 9 are views of prior art devices respectively corresponding to FIGURES 6 and 7.

Detailed description

The embodiment of the invention herein disclosed is best seen in FIGURE 1 to comprise an elongated housing 10, preferably of sheet metal, of generally trough-like shape having a back wall 11 margined by spaced side walls 12. Side walls 12 are provided with a plurality of slots 13, later to be described in greater detail, the slots in one of the walls 12 being transversely aligned with those in the other wall 12 and extending slightly into the back wall 11 to provide sufficient flexibility to the housing so that it may be readily bent to generally conform to both flat or curved surfaces.

Extending longitudinally of the housing 10 (see especially FIGURE 2) and disposed between the side walls 12, 12 thereof is an elongated, metallic-sheated electric resistance heating element 14. As herein disclosed, element 14 is of hair-pin type, having a pair of legs 15 joined at one end by an integral bight portion 16. The bight portion 16 at one end of the element legs is disposed at one end of the housing 10 while the opposite ends of legs 15 terminate at the other end of the housing in transversely extending terminal portions 17, 17 which are adapted to be suitably connected to a source of electrical energy.

For supporting element 14 within the housing 10 and as best seen in FIGURES 2 and 3, a plurality of U-shaped brackets 18 are spaced longitudinally of the housing between the sidewalls 12. Each bracket has an intermediate portion 19 slotted at 20 to slidably receive the element legs 15 and end portions 21 adapted to be secured to respective housing side walls 12 as by spot welding or the like. Bracket slots 20, of course, are in aligned relation to receive the element 14 and, for a purpose to appear, the brackets are spaced slightly from the back wall 11.

In order to prevent unintentional disassembly of element 14 from the housing, such element having previously been assembled therewith by inserting its bight portion 16 progressively through the bracket slots from the left (in the position of parts shown in FIGURE 2) end of the housing, the lower margin of that bracket 18 closest to the element bight portion 16 will be displaced between the element legs 15 as shown in FIGURE 4. Such displaced bracket portion forms an abutment 22 which will interengage with the element bight portion 16 to prevent disassembly of the element from the housing in the direction of the terminal portions 17, and the upturned portion of such portions prevent disassembly in the opposite direction.

Since only the heat which escapes from the open side of the housing 10 functions to heat a plate against which the open side of the heater assembly is disposed, it is desirable to limit any other heat loss from the housing. For this reason and as best seen in FIGURE 3, a blanket of asbestos cloth or the like 23 is disposed between the housing legs 12 and lies against the housing back wall 11. Preferably, blanket 23 extends the full length of the housing and reaches substantially from side wall to side wall thereof.

Metal plate 24 underlies (in the position of parts seen in FIGURE 3) the blanket 23 and is substantially coextensive therewith. As previously mentioned, the brackets 18 are spaced slightly from the housing back wall 11 and as herein shown, such spacing is of the magnitude to closely but slidably pass the combined thickness of the blanket 23 and the plate 24. Note that the longitudinally spaced brackets 18 function to retain the plate 24 closely against the blanket 23 and thus the latter closely against the housing back wall 11.

As best seen in FIGURE 3 and for purpose of retaining the housing 10, the blanket 23 and the plate 24 in assembled relation, a rivet 25 at the center of the housing passes through aligned apertures formed in the housing back wall 11, the blanket and the plate. By thus securing the housing, blanket and plate together at but a single place longitudinally thereof, there will be a minimum of interference with flexibility of the assembly. Further, the single center rivet connection provides for maximum relative movement of the parts on opposite sides thereof for expansion and for differential radii brought about by longitudinal bending.

With the heater assembly in the rectilinear form seen in FIGURE 1, it may be suitably clamped against a flat plate with its open side, of course, directed against such plate for heating the latter. Moreover, since the heater assembly is quite flexible, as a result of the side wall slots 13, it may also be clamped in conforming relation against an arcuate plate as shown in FIGURE 5.

Turning now to the particular arrangement of the side wall slots 13 and as best seen in FIGURES 1 and 6, each of the slots 13 is relatively narrow at its end adjacent the housing back wall 11 and relatively wide at its opposite end adjacent the open housing side. This is in contrast to the usual straight slot shown in the prior art construction of FIGURE 8 wherein corresponding parts are identified by the same reference characters but with the suffix "a" added. Note that with both the present heater and that of the prior art in rectilinear form (FIGURES 6 and 8 respectively), the prior-art slot 13a provides a much greater area through which heat can escape from the housing than does the slot 13 of the present invention.

Turning now to FIGURES 7 and 9 wherein the present invention and the prior-art heater are respectively shown bent to conform to the same minimum radius, it will be noted that here again, slot 13a provides a much greater area for the escape of heat than does the slot 13. Accordingly, it will be understood that by employment of the tapered slot herein disclosed, less heat is lost from the interior of the heater housing and thus greater heating efficiency results.

While apparatus of the present invention has been shown as applied to the outer curvature of a metal plate, it will readily be apparent that it can equally well be applied to the inner curvature of a plate. Moreover, when so applied, the advantage of the tapered slots in the housing side walls over the prior art straight slots will still be present.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. In electric heating apparatus wherein a metal-sheathed electric resistance heating element is disposed within a housing having a back wall margined by transversely spaced side walls between which such element is disposed, the improvement wherein a sheet metal reflector is interposed between said housing back wall and said heating element,
   wherein flexible material of poor heat conductivity is interposed between said reflector and said housing back wall, wherein said housing side walls are transversely slotted for housing flexibility,
   wherein bracket means are secured to and extend between said housing side walls and slidably engage said reflector to retain the latter and said flexible material closely adjacent said housing back wall,
   and wherein said bracket means are configurated to receive and support said heating element adjacent the open side of said housing.

2. The construction of claim 1 wherein said housing is elongated,
   wherein said element is also elongated and extends longitudinally of said housing,
   and wherein said reflector and said flexible material are anchored to said housing back wall at but one place longitudinally of said housing to minimize interference with housing flexibility.

3. The construction of claim 1 wherein said housing is elongated,
   wherein said element is also elongated and extends longitudinally of said housing,
   wherein said bracket means comprises a pair of sheet metal brackets spaced-apart longitudinally of said housing,
   wherein aligned apertures are disposed wholly within respective brackets,
   and wherein said heating element extends through the apertures aforesaid for support by said brackets.

4. The construction of claim 3 wherein said heating element is of hair-pin configuration with a pair of legs in side-by-side relation connected by a bight portion,
   and wherein said bracket apertures are in the form of a slot and slidably pass said element bight portion.

5. The construction of claim 4 wherein each of said brackets has end portions secured to respective side walls and an intermediate portion in which said aperture is formed, and wherein said bracket intermediate portions slidably engage said reflector.

6. The construction of claim 5 wherein said element is assembled with said housing by sliding the bight portion of said element through respective bracket apertures,
   and wherein said element is retained against unintentional disassembly from said housing by deformation of an aperture-margining portion of the bracket adjacent said element bight portion to a position projecting between said element legs for engagement with said element bight portion for the purpose aforesaid.

7. In electric heating apparatus for weld pre-heating and the like wherein a metal-sheathed hair-pin type electric heater is disposed longitudinally within an elongated sheet-metal trough-like housing, the improvement comprising a pair of sheet-metal brackets secured within said trough in spaced-apart relation, each bracket having a slot and said heater is assembled with said housing by sliding its bight portion through said bracket slots, said heater being retained against unintentional disassembly from said housing by deformation of a margin of a bracket slot to a position projecting between the legs of the heater and for engagement with said heater bight portion.

8. In electric heating apparatus which is longitudinally deformable to correspond to various configurations of a surface to be heated, wherein an elongated metal-sheathed electric heater is held longitudinally within an elongated sheet-metal trough, the trough being defined by a back wall margined by transversely spaced side walls between which the heater is disposed, the improvement wherein said trough side walls are provided with a series of slots, each slot extending from the free margin of the wall in which it is formed and into the back wall, and each slot being narrower at its end adjacent said back wall than it is at its end at said free margin to minimize heat loss from the interior of said trough and to improve longitudinal flexibility of said trough.

References Cited

UNITED STATES PATENTS

| | | | |
|---|---|---|---|
| 2,367,369 | 1/1945 | Osterheld | 219—336 |
| 2,877,332 | 3/1959 | Senior | 219—536 |
| 3,005,082 | 10/1961 | Ammerman | 219—536 X |
| 3,032,638 | 5/1962 | Hall | 219—354 X |
| 3,207,887 | 9/1965 | Drugmand et al. | 219—535 |
| 3,272,968 | 9/1966 | Volker | 219—535 |

VOLODYMYR Y. MAYEWSKY, *Primary Examiner.*

U.S. Cl. X.R.

219—137, 347, 542, 549; 266—5